(12) United States Patent
Okamoto

(10) Patent No.: US 8,295,689 B2
(45) Date of Patent: Oct. 23, 2012

(54) CONTENTS REPRODUCING APPARATUS AND CONTENTS REPRODUCING METHOD

(75) Inventor: Chikashi Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 734 days.

(21) Appl. No.: 12/474,503

(22) Filed: May 29, 2009

(65) Prior Publication Data

US 2010/0074595 A1 Mar. 25, 2010

(30) Foreign Application Priority Data

Sep. 25, 2008 (JP) ................................ 2008-245114

(51) Int. Cl.
  *H04N 5/93* (2006.01)
  *H04N 5/77* (2006.01)
  *H04N 9/80* (2006.01)
(52) U.S. Cl. .................... 386/353; 386/359; 386/248
(58) Field of Classification Search .................. 386/353, 386/359, 248
See application file for complete search history.

(56) References Cited

U.S. PATENT DOCUMENTS

| | | | | |
|---|---|---|---|---|
| 5,526,351 | A | * | 6/1996 | Mochinaga et al. .......... 370/399 |
| 6,339,659 | B1 | * | 1/2002 | Fukuhara et al. ............ 382/249 |
| 7,496,946 | B1 | * | 2/2009 | Wehmeyer et al. ............. 725/59 |
| 7,801,409 | B2 | * | 9/2010 | Howell et al. ................. 386/353 |
| 7,996,586 | B2 | * | 8/2011 | Liu ................................. 710/36 |
| 2003/0067884 | A1 | * | 4/2003 | Abler et al. .................... 370/252 |
| 2006/0028993 | A1 | * | 2/2006 | Yang et al. ..................... 370/250 |
| 2008/0159124 | A1 | * | 7/2008 | Sasaki ........................... 370/217 |
| 2011/0038381 | A1 | * | 2/2011 | Oren et al. ..................... 370/401 |

FOREIGN PATENT DOCUMENTS

| | | |
|---|---|---|
| JP | 2001-007724 | 1/2001 |
| JP | 2001-245226 | 9/2001 |
| JP | 2004-312595 | 11/2004 |
| JP | 2007-116223 | 5/2007 |
| JP | 2008-219311 | 9/2008 |

* cited by examiner

*Primary Examiner* — Helen Shibru
(74) *Attorney, Agent, or Firm* — Antonelli, Terry, Stout & Kraus, LLP.

(57) ABSTRACT

For providing a mechanism of contents reproducing equipment, for operating a communicating device and a decoding device, which are provided in each of equipments connected therewith through a network, in cooperation with each other, so as to enable to change from a reproducing process, which is relatively low in processing capacity required, to a reproducing process, which is relatively high, reproduction is conducted of the contents, which is low in the processing capacity required for reproduction, with using the communicating means and the decoding means, which are lower in the processing capacity. In parallel therewith, reproduction is conducted of contents, which is high in the processing capacity required for reproduction, with using the communicating means and the decoding means, which are higher in the processing capacity thereof. Also, measurement is done on a processing time necessary for receiving and decoding of encoded contents for a unit of time, or a processing volume of the receiving process and the decoding process of the encoded contents, which can be processed during the unit of time, and thereby managing it as the processing capacity.

9 Claims, 9 Drawing Sheets

FIG. 4

PROCESSING CAPACITY DATABASE 126

| COMMUNICATION DEVICE | DECODING DEVICE | PROCESSING CAPACITY |
|---|---|---|
| TV-A | TV-X | HIGH |
| HDR-A | HDR-X | LOW |
| | HDR-Y | MIDDLE |
| TV-B | TV-Y | MIDDLE |
| TV-C | | LOW |
| . . . | . . . | . . . |

TABLE-DISPLAY OF REDUCED SCREENS
(CONDITION OF SELECTING CONTENTS 100)

PUSHDOWN "RIGHT" KEY
ONE (1) TIME ON
REMOTE CONTROLLER

TABLE-DISPLAY OF REDUCED SCREENS
(CONDITION OF SELECTING CONTENTS 200)

PUSHDOWN "SELECT/DETERMINE"
KEY ONE (1) TIME ON
REMOTE CONTROLLER

FULL-SCREEN DISPLAY OF
CONTENTS 200

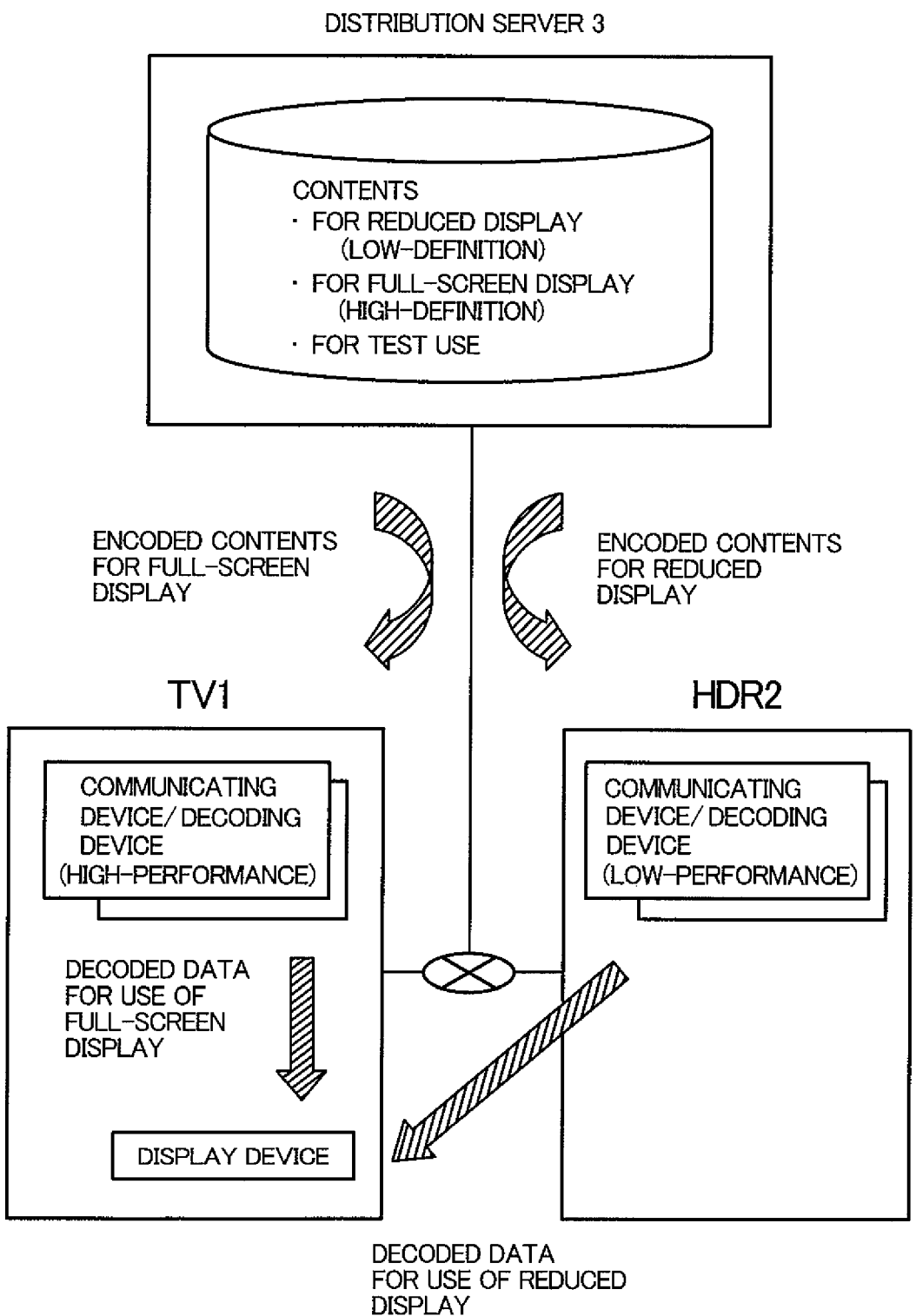

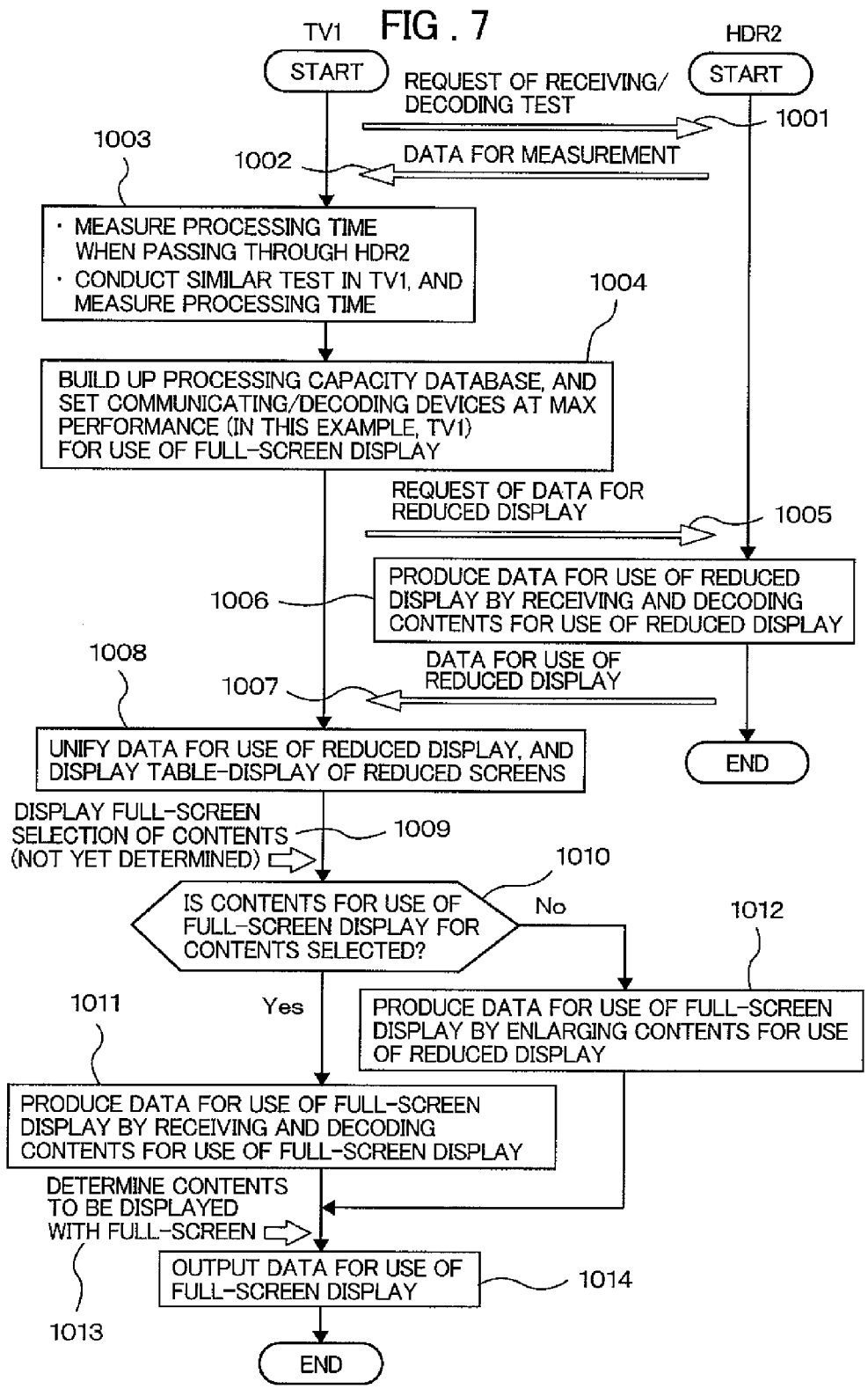

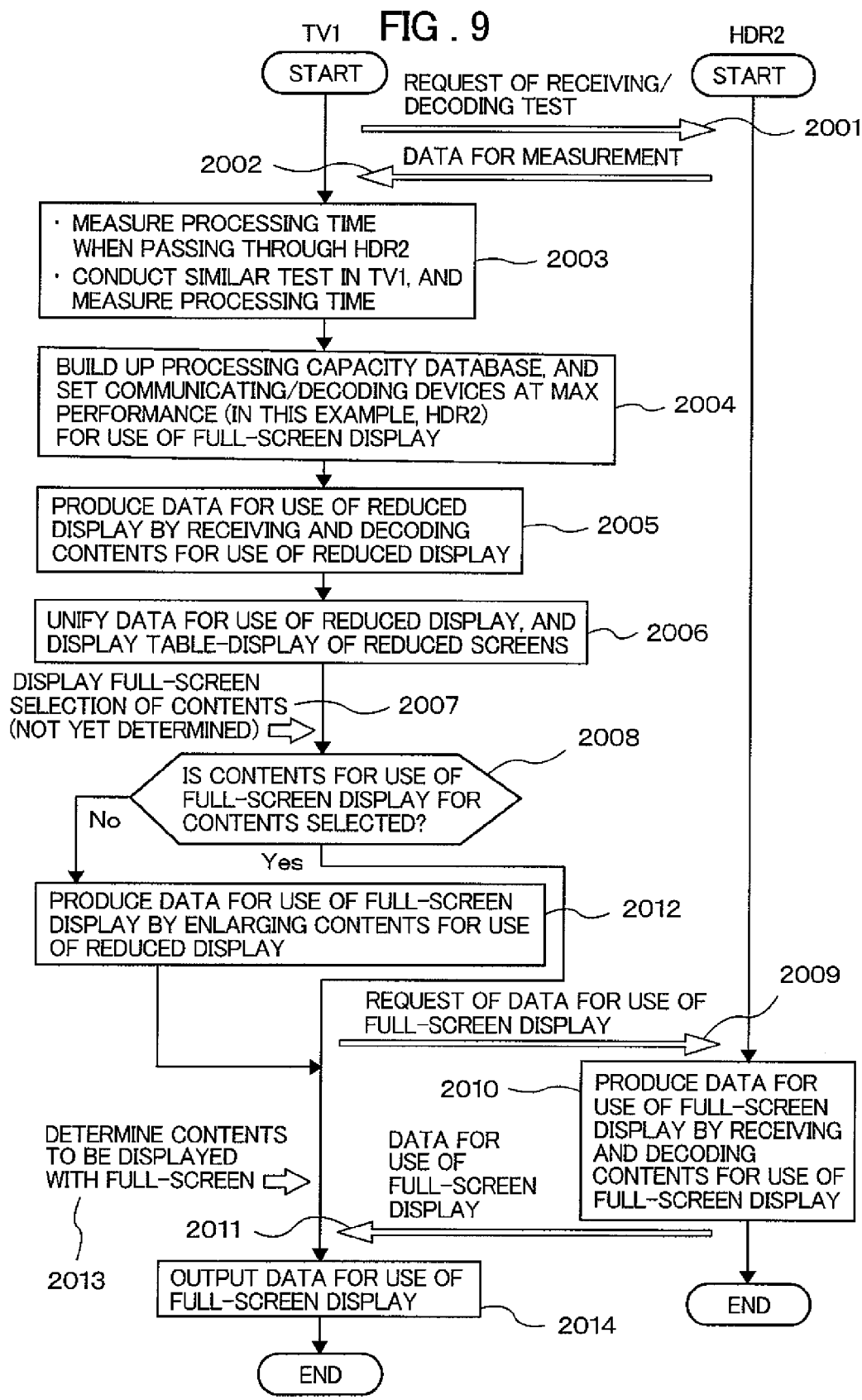

CONTENTS REPRODUCING APPARATUS AND CONTENTS REPRODUCING METHOD

BACKGROUND OF THE INVENTION

The present invention relates to a technology for reproducing contents by means of equipment connected with a network.

Accompanying with spreading of BS (Broadcast Satellite) and CATV (Cable Television), a number of broadcast stations of TV (Television) broadcasting is increasing. Further, in recent years, it is possible to receive a stream through a network, and also to reproduce various kinds of contents stored in other equipments in a house, such as, a HDR (Hard Disk Recorder), etc., for example, or to select one from an innumerable number of contents within a stream contents distribution server out of the house, thereby to reproduce it.

In this manner, under the circumstance of being able to select and for reproducing a large number of broadcast stations/contents, in particular, with a method of selecting a receiving contents by designating a channel number, while liking the channels with the broadcast stations/contents, there is drawback that an enormous number of channels is necessary and is bad in an operability when designating.

As a technology for dissolving this problem, there is one of memorizing data of the plural number of channels, substantially at the same time, while exchanging the receiving channel of one (1) unit of a tuner, and is disclosed, for example, in the following Patent Document 1. With using the technology disclosed in the Patent Document 1, it is possible to display six (6) kinds of pictures of broadcast contents, each being reduced down to ⅙ or less, for example, for each channel (hereinafter, being called "a reduced list display") on one (1) screen).

Also, in the stream contents distribution service, there is a method of distributing high-definition contents for the full screen to be reproduced, but after distributing a plural number of low-definition contents for a reduced screen, to be displayed as the reduced list display, for a user to select one therefrom.

Japanese Patent Laying-Open No. 2001-245226 (see page 1, and FIG. 2).

BRIEF SUMMARY OF THE INVENTION

With such the method of exchanging the channel as disclosed in the Patent Document 1, it is impossible to obtain an effect, fully, in particular, in case of taking a long time for exchanging the channel, such as, the digital broadcast, and also in case of receiving the stream through the network, for example.

Also, in the stream contents distribution service, if it is the method of distributing high-definition contents for the full screen to be reproduced, but after distributing a plural number of low-definition contents for the reduced screen, to be displayed as the reduced list display, for the user to select one therefrom, then it takes a long time starting from when the user determines the selection up to the time when starting reproduction of the high-definition contents.

An object of the present invention, accomplished by taking the situation mentioned above into the consideration thereof, is to provide a mechanism of the contents reproduction equipments, for achieving an improvement comparing to the conventional art, such as, for speeding up exchanging from the reproducing process, being relatively low in processing capacity required therein, to the reproducing process being relatively, by bringing communicating apparatuses and decoder apparatuses, which are equipped with each of equipments connected with the network, in operation thereof, so as to display the full screen, quickly, when the user designates a specific reduced screen, etc.

For dissolving the problem mentioned above, with the contents reproducing apparatus (or the reproducing method) according to the present invention, contents reproducing equipment (or, a reproducing apparatus) has: a communicating means for conducting a communication between reproducing equipments (or, a reproducing apparatus(es)) connected therewith through a network, and a receiving process of encoded contents information, as the contents information encoded; a decoding means for conducting a decoding process of the encoded contents information, which is received by the communicating means; a processing capacity managing means for managing the processing capacities of the receiving process and the decoding process; a selecting means for selecting the communicating means and the decoding means, in accordance with a predetermined format, upon basis of information of the processing capacity, from a plural number of the communicating means and a plural number of the decoding means, thereby conducting the communicating means and the decoding means, which are selected, to execute the receiving process and the decoding process of the encoded contents information; and a display means for displaying the contents information, which the decoding means decodes, as a display screen thereof.

Also, in the contents reproducing equipment, according to the present invention, the processing capacity managing means manages, including therein the processing capacity in other equipment, which is connected therewith through the network.

Also, in the contents reproducing equipment, according to the present invention, the selecting means selects a set of the communicating means and the decoding means, which are higher in the processing capacity.

Also, the contents reproducing equipment, according to the present invention, further comprises a contents recognizing (or identifying) means for recognizing or identifying the processing capacity, which is required for the substance and reproduction of the contents information, which can be received, wherein the contents recognizing means recognizes or identifies whether other contents information, being same to the contents information under selection or including it therein, is in the receivable condition or not, and when recognizing or identifying that the other contents information is higher in the processing capacity required for reproduction than that of the contents information under selection, the selecting means prevents the communicating means and the decoding means, which are higher in the processing capacity, from conducting the receiving process and the decoding process of the contents information under selection therein.

Also, in the contents reproducing equipment, according to the present invention, the contents recognizing means recognizes or identifies that the contends information is same to the contents information under selection, or that other contents information, including it therein, is in receivable condition, when recognizing or identifying that the other contents information is higher in the processing capacity, which is required for reproduction thereof, than the contents information under selection, the selecting means conducts the communicating means and the decoding means, which are lower in the processing capacity, to execute the receiving process and the decoding process of the contents information under selection, and the selecting means conducts the communicating means and the decoding means, which are higher in the processing capacity, to execute the receiving process and the decoding process therein, and the display means displays the contents information under selection, which is decoded by the decoding means lower in the processing capacity, as a display screen thereof, and when the contents recognizing means recognizes or identifies that selection of the contents information is changed from the contents information under selection into other contents information, the display means display the other contents information, which is decoded by the decoding means, which is higher in the processing capacity, as the display screen thereof.

Also, the contents reproducing equipment, according to the present invention, further has a processing time measuring (or detecting) means for measuring or detection the processing time necessary for the receiving process and the decoding process of the encoded contents information during a unit of time, wherein the processing capacity managing means manages one being short in the processing time, which is measured by the processing time measuring means, to be that being high in the processing capacity thereof.

Also, in the contents reproducing equipment, according to the present invention further has a processing volume measuring (or detecting) means for measuring or detecting a processing volume necessary for the receiving process and the decoding process of the encoded contents information, which can be processed during the unit of time, wherein the processing capacity managing means manages one being larger in the processing volume, which is measured by the processing volume measuring means, to be that being high in the processing capacity thereof.

With such structures as was mentioned above, it is possible to receive the encoded contents information, with using the communicating means and the decoding means, which are higher in the processing capacity thereof. For this reason, it is possible to reproduce the contents requiring higher processing capacity for reproduction thereof, with stability much more. For example, the contents information having higher definition can be reproduced under the condition of less noises.

Also, with such structures as was mentioned above, the contents information requiring low processing capacity for reproduction thereof, with using the communicating means and the decoding means, lower in the processing capacity thereof. In parallel therewith, the contents information requiring high processing capacity for reproduction thereof, with using the communicating means and the decoding means, higher in the processing capacity thereof. For this reason, it is possible to achieve a high-speed change, from the reproducing proves relatively low in the processing capacity required to the reproducing process relatively high in the processing capacity.

For example, the encoded contents information of low-definition is received and decoded, to display them on a table-display of reduced screens, and the encoded contents information of high-definition is received and decoded, to display it displayed with a full-screen display. For this reason, when a user tries to select the contents information to be reproduced on the table-display of reduced screens, it is possible to receive and decode the high-definition contents information, having same substance to the contents information under selection at present, under a background, therefore it is possible to start reproduction of the high-definition for use of full-screen, quickly, when a viewer or audience determines the selection of contents.

Also, with such structures as was mentioned above, measurement is made on the processing time, necessary for receiving and decoding of the encoded contents information for the unit of time, or the processing volume of the receiving process and the decoding process for the encoded contents information, which can be processed during the unit of time, and it is managed as the processing capacity. For this reason, obtaining a dynamic value actually measured while operating the equipment in actual operating circumstances, it is possible to select preferable communicating means and decoding means, comparing to the conventional art.

According to the present invention, it is possible to achieve an improvement in operability and/or convenience, comparing to the conventional art, in relation with the reproduction of contents within the equipments connected with the network.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 4 is a view for showing an example of a processing capacity database 126 of the TV1, according to the embodiment of the present invention;

FIG. 6 is a view for showing an outlook structure of a system, according to an embodiment 1 of the present invention;

FIG. 7 is a flowchart for showing the operations of the TV1 and the HDR2, according to the embodiment 1 of the present invention;

FIG. 9 is a flowchart for showing the operations of the TV1 and the HDR2, according to the embodiment 2 of the present invention.

DETAILED DESCRIPTION OF THE INVENTION

Hereinafter, embodiments according to the present invention will be fully explained by referring to the attached drawings.

However, hereinafter, contents information will be described only "contents". Explanation will be made on a reproducing apparatus and reproducing equipment, upon bases that they have the same meaning.

First of all, explanation will be made on the outlook structure of the system, according to an embodiment of the present invention, by referring to FIG. 1.

Figure 1:
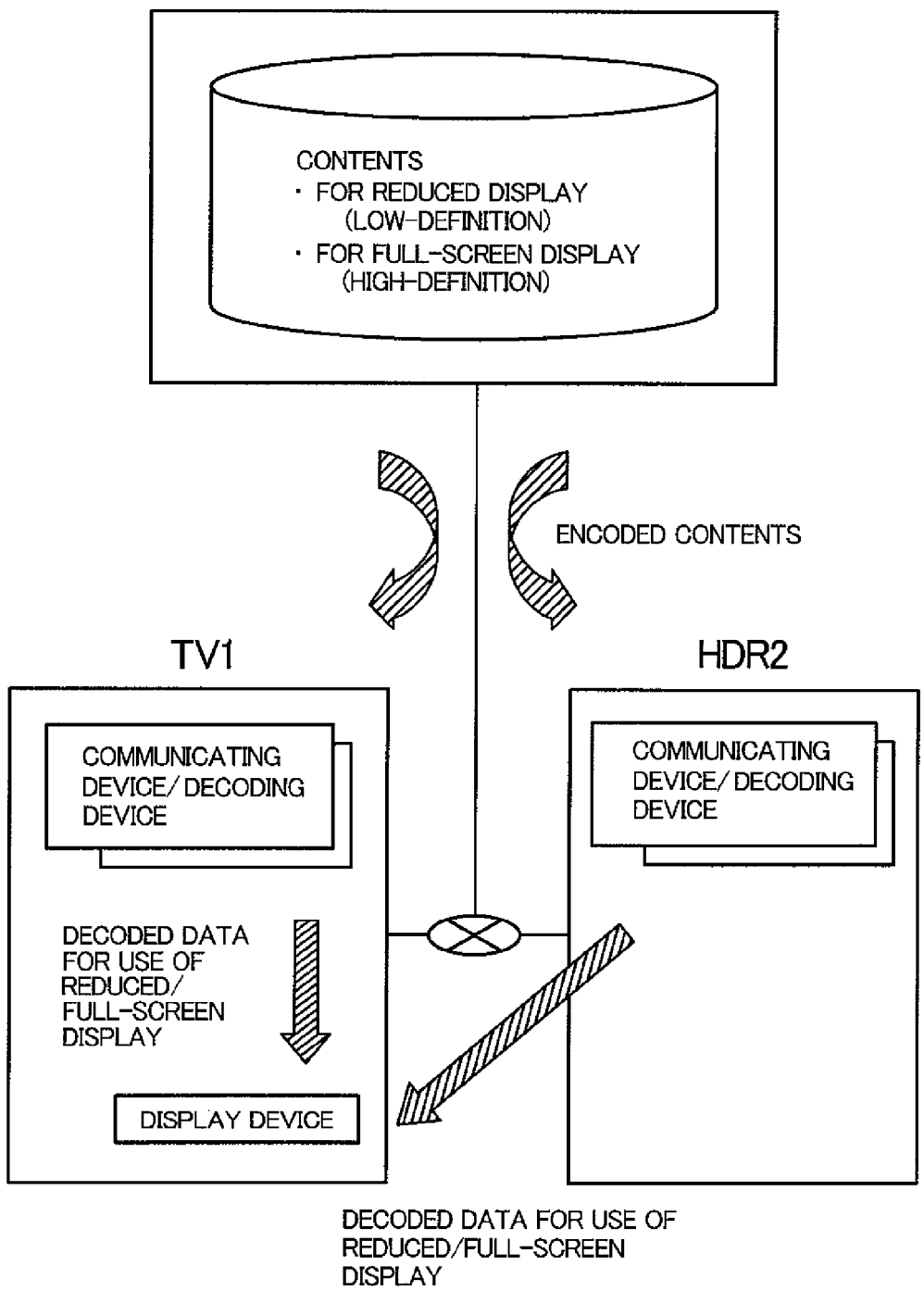
FIG. 1 is a view for showing an outlook structure of a system, according to an embodiment of the present invention.

As is shown in FIG. 1, the system according to the present embodiment is constructed with TV1, HDR2, and a distribution server 3, wherein they are connected with each other through a network. The distribution server 3 records therein low-definition contents for the reduced display, and high-definition contents for the full screen display. Each of the TV1 and the HDR2 has a communicator apparatus and a decoder apparatus, and thereby receiving the coded low-definition contents for the reduced display or the coded high-definition contents for the full screen display, so as to decode them. The TV1 has a display apparatus, and it outputs data for the reduced display or the data for the full screen display, which are decoded by the decoder apparatus of the TV1 or the HDR2.

Next, the outlook structure of the TV1, according to the embodiment of the present invention, will be explained by referring to FIG. 2.

Figure 2:
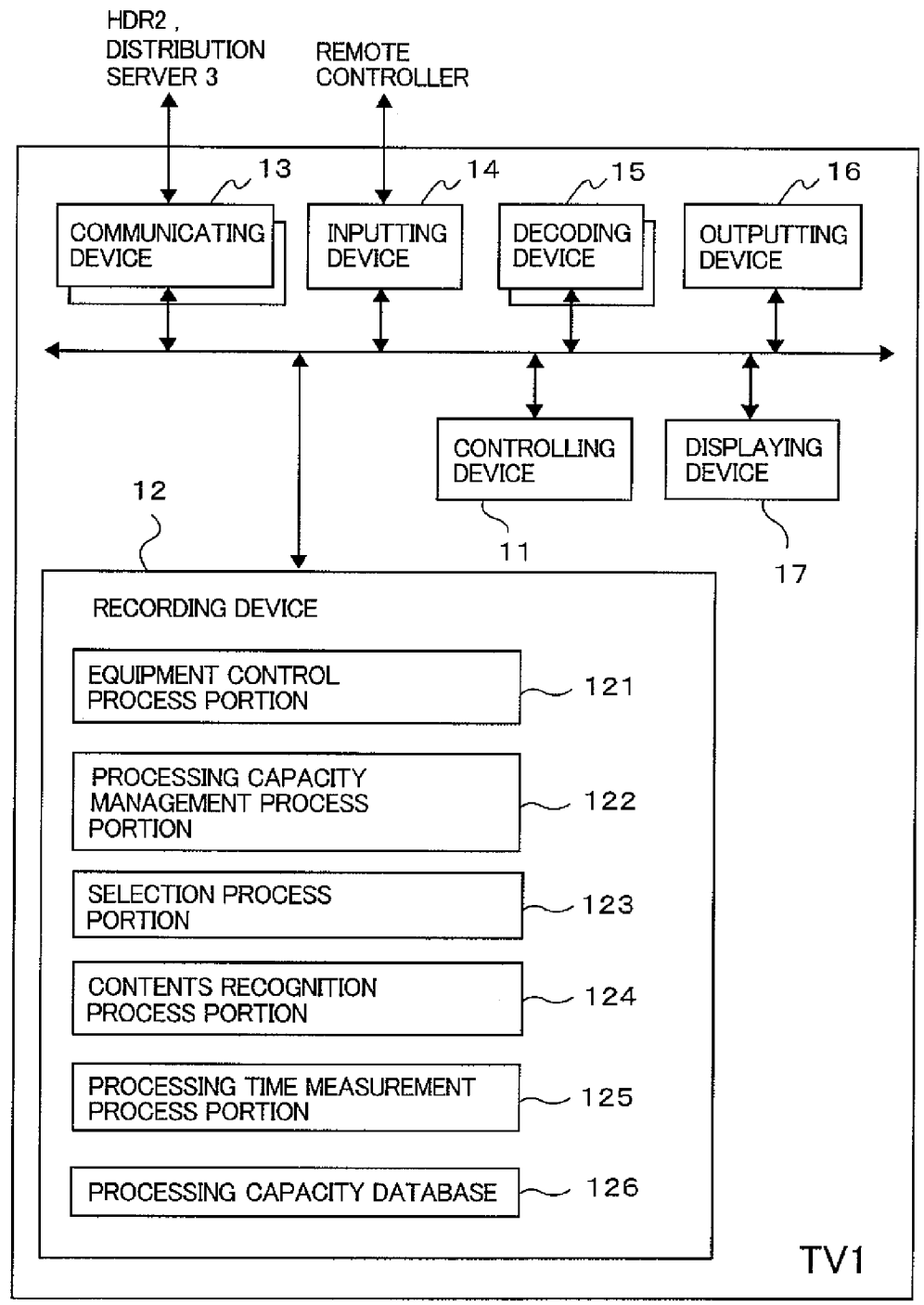
FIG. 2 is a view for showing an outlook structure of TV1, according to the embodiment of the present invention.

As is shown in FIG. 2, according to the present embodiment, the TV1 has a controlling device 11, a recording device 12, a communicating device 13, an inputting device 14, a decoding device 15, an outputting device 16 and a display device 17.

The controlling device 11 is a device for executing a processing program, which the recording device holds therein, and thereby controlling the equipment as a whole.

The recording device 12 is a device for recording the processing program for controlling the operation of the TV1. As an example of the recording device 12 can be listed up a disc, a tape, a semiconductor, etc. The processing program held by the recording device 12 has an equipment control process portion 121, a processing capacity management process portion 122, a selection process portion 123, a contents recognition process portion 124, a process time measurement process portion 125 and a processing capacity database 126.

The equipment control process portion 121 is a processing portion, for operating each of the devices in the TV1 in cooperation with each other, as the contents reproducing equipment. For example, it receives an instruction, which is generated by a user through a remote controller or the like, and receives coded stream data of the contents from the distribution server 3 in accordance with that instruction, and then the data is decoded in the decoding device 15, to be outputted to the outputting device 16; thereby achieving the contents reproducing function for displaying it on the display device 17.

Also, it achieves an inter-equipments cooperation function, for communicating with other equipments, such as, the HDR2, through the communicating device 13, to operate them in cooperation with each other, etc. Also, it further conducts a process for displaying video data, which is received from other equipment, such as, the HDR2, etc., through the communicating device 13, on the display device 17.

The processing capacity management process portion 122 is a processing portion, for managing a receiving process capacity in the communicating device in each of the equipments, and a decoding process capacity in the decoding device, with using the processing capacity database 126.

The selection process portion 123 is a processing portion for selecting the communicating device and the decoding device in accordance with a predetermined format, upon basis of the process capacities of the plural number of communicating devices and the decoding devices, which the processing capacity management process portion 122 manages, so as to let the communicating device and the decoding device selected to conduct the receiving and the decoding.

The contents recognition process portion 124 is a processing portion, for recognizing details of the contents, which can be received from the distribution server 3 through the communicating device 13, the processing capacity required for reproduction thereof, and the contents that is in selection at present. It recognizes on whether it is same or not to the contents in selection, or possibility/impossibility of receiving other contents including that, and a degree of definition of that contents.

The process time measurement process portion 125 is a processing portion, for measuring a processing time necessary for receiving an mount of information of the coded contents corresponding to a predetermined unit of time, and a processing time necessary for decoding said amount of information of the coded contents, for example, when reproducing the contents, as the reproduction time thereof. It is assumed that the time necessary for the receiving mentioned above and the time necessary for decoding thereof, which are measured by the process time measurement process portion 125, are called a "unit processing time", and this unit processing time is memorized in the processing capacity management process portion 122.

And, if this unit processing time is short, it can be said that the processing capacity, i.e., the capacity of processing in the communicating device 13 and the decoding device 15, is high, for example.

This unit process time is assumed to be managed, so that it can be outputted, as a response to an inquiry from other process device or process portion, to be treated as an index for estimating or deciding the processing capacity of the processing device, such as, the communicating device 13 and/or the decoding device 15 mentioned above, etc., or it can output the communicating device and/or the decoding device, being high in the processing capacity thereof, etc., as a response thereto.

In the above-mentioned, the process time measurement process portion 125 measures, detects and obtains the time necessary for receiving the contents of the predetermined amount of information (herein, this "predetermined amount of information" can be expressed that the reproduction time is a predetermined time), and the time necessary for decoding the contents of that predetermined amount of information, and thereby converting the capacity of processing of the device for conducting the receiving process, or the capacity of processing of the device for conducting the decoding into a numerical value or data, to be handled with.

However, the conversion of the capacity of processing of the device mentioned above into the numerical value or the data should not be restricted only to this.

For example, it is also possible to deal with the numerical value or data, by measuring, detecting and/or obtaining a size or volume of the amount of information of the coded contents, which can be received by the communicating device 13 mentioned above, within a predetermined period of time determined in advance, for example, as an index indicating the processing capacity of the communicating device 13 mentioned above. In addition thereto, it is also possible to deal with the numerical value or data, by measuring, detecting and/or obtaining a size of the amount or volume of information of the coded contents, which can be decoded by the decoding device 15, within a predetermined period of time, as an index indicating the processing capacity of the decoding device 15.

In this case, it is possible to define and call, what was defined and called as a unit processing time in the above, by replacing it with a unit amount or volume of information processing. And, if this unit amount or volume of information processing is large, it can be said that the processing capacity of the communicating device 13 mentioned above or the decoding device 15 mentioned above is high.

This unit time information amount or volume may be memorized within the above-mentioned processing capacity management process portion 122, to be managed therein. Also, this unit time information amount or volume may be measured, by means of the process time measurement process portion 125 mentioned above, and also there may be provided a processing portion, which has a name, a processing information volume measuring process portion, for example.

The processing capacity database 126 is a database for the processing capacity management process portion 122 to manage the receiving processing capacity in the communicating device 13 and the decoding processing capacity within the decoding device 15, for each of the equipments.

The communicating device 13 is an apparatus for conducting communication between the HDR2 and the distribution server 3. As an example of the communication method, there are USB, IEEE1394, Ethernet®, wireless LAN, etc.

The inputting device 14 is an interface apparatus for a user to operate the TV1. As an example of the inputting device 14, there may be a button, a switch, a key, a dial, a stick, a pad, a mouse, a remote controller, a touch panel, etc.

The decoding device 15 is an apparatus for decoding the contents data encoded.

The outputting device 16 is an apparatus for outputting audio or video data therefrom.

The display device 17 is an apparatus for displaying a picture of full-screen display of the contents or a picture of a table display of reduced screens thereof, etc., to the user. As an example of the display device 17, there are a CRT display, a liquid crystal display, a plasma display, an organic electroluminescence (EL) display, etc. However, the display device 17 may be connected with the equipment in an outside thereof, like the HDR2, as a monitor, through the outputting device 16, but not be provided within the TV1.

Further, with the communicating device 13 and the decoding device 15, there are cases where they may be provided in a plural number thereof.

In the embodiment of the present invention, explanation will be made on the case where the encoded contents data is received from the distribution server 3 through the receiving device 13, thereby decoding it within the decoding device 15.

Next, explanation will be made on the outlook structures of the HDR2, according to the embodiment of the present invention, by referring to FIG. 3.

Figure 3:
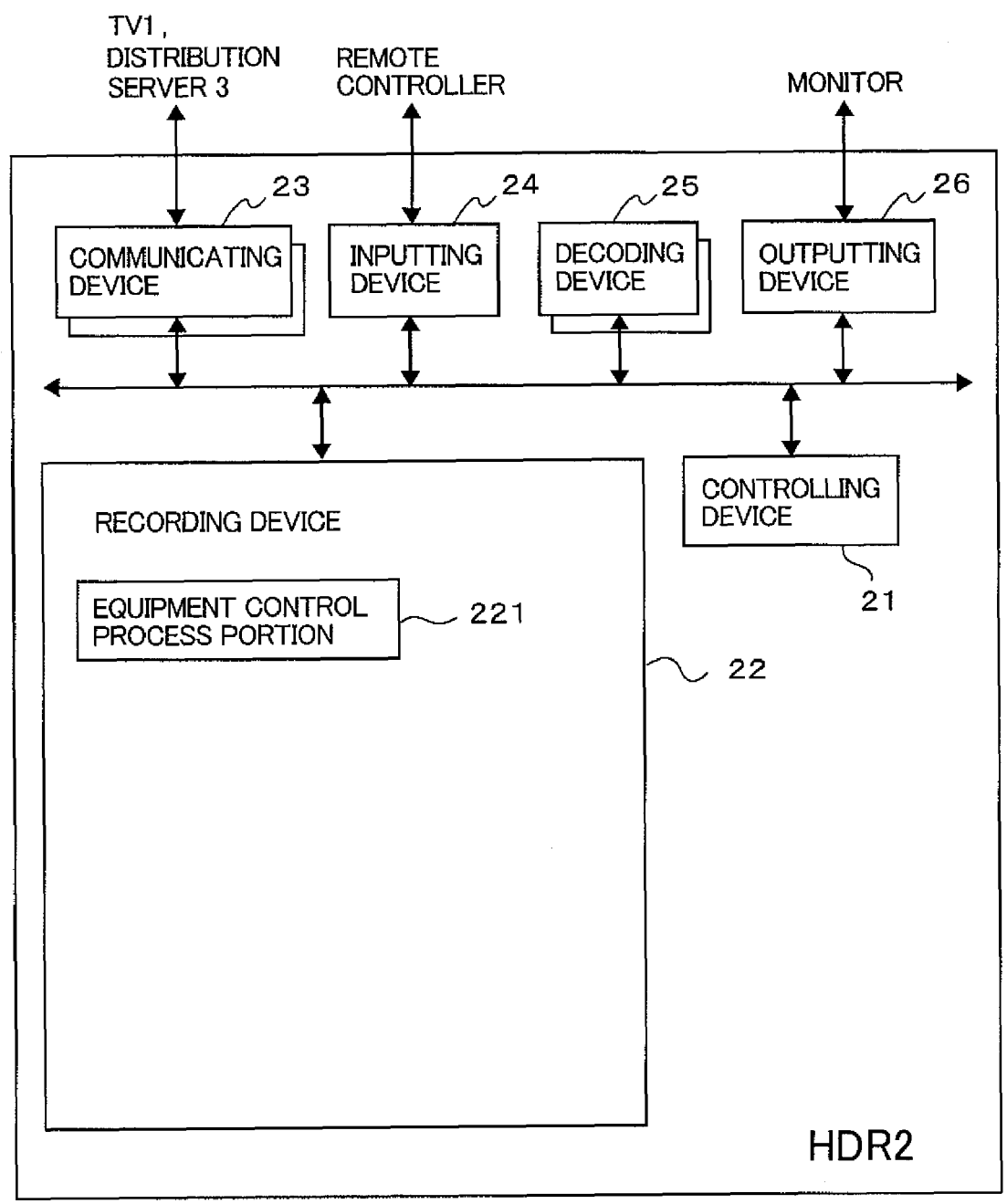
FIG. 3 is a view for showing an outlook structure of HDR2, according to the embodiment of the present invention.

The HDR2 according to the present embodiment, as is shown in FIG. 3, has a controlling device 21, a recording device 22, a communication device 23, an inputting device 24, a decoding device 25, and an outputting device 26. The HDR2 is same to the HDR1 shown in FIG. 2, except for that the display device 17 is not provided within the housing and that the processing program recorded in the recording device 12 differs from that the recording device 22 records therein, and therefore detailed explanation thereof will be omitted on portions other than the recording device 22.

The recording device 22 is an apparatus for recording a processing program for controlling the operation of the HDR2 therein. As an example of the recording apparatus 22, for example, there are a disc, a tape, a semiconductor, etc. The processing program held by the recording device 22 has an equipment control process portion 221.

The equipment control process portion 221 is a process portion for bringing each device of the HDR2 in cooperation with, so as to operating them as a HDR equipment. For example, an instruction, which is generated by the user through the remote controller or the like, is received by the inputting device 24, and in accordance with that instruction, the encoded stream data of contents is received from the distribution server 3 through the communicating device 23, to be decoded within the decoding device 25, and it is outputted to the outputting device 26; i.e., achieving a contents reproducing function. Also, communication is conducted between other equipments, such as, the TV1, through the communicating device 23, and thereby achieving an inter-equipment cooperation function for operating them in cooperation with, etc. And, it also conducts a process of transmitting screen data decoded to the other equipments, such as, the TV1, through the communicating device 23.

Further, with the communicating device 23 and the decoding device 25, there are cases where they may be provided in a plural number thereof.

In the embodiment of the present invention, explanation will be made on the case where the encoded contents data is received from the distribution server 3 through the receiving device 23, thereby decoding it within the decoding device 25.

Next, explanation will be made on the processing capacity database 126 of the TV1, according to the embodiment of the present invention, by referring to FIG. 4, as an example thereof.

A column 1261 of the processing capacity database 126 indicates an identification mark of the communicating device, a column 1262 indicates an identification mark of the decoding device, and a column 1263 indicates the processing capacity in combination with the communicating device and the decoding device. In this example, it is shown that the higher processing capacity can be obtained in case where a TV-A is used as the communication device and a TV-X is used as the decoding device.

Next, explanation will be made on the display screen of the TV1, according to the embodiment of the present invention, by referring to FIGS. 5A to 5C.

Figure 5A:
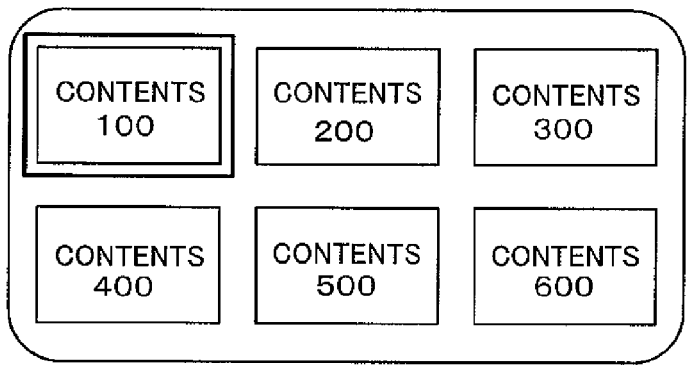
FIGS. 5A to 5C are views for showing an example of a display screen of the TV1, according to the embodiment of the present invention.
Figure 5B:
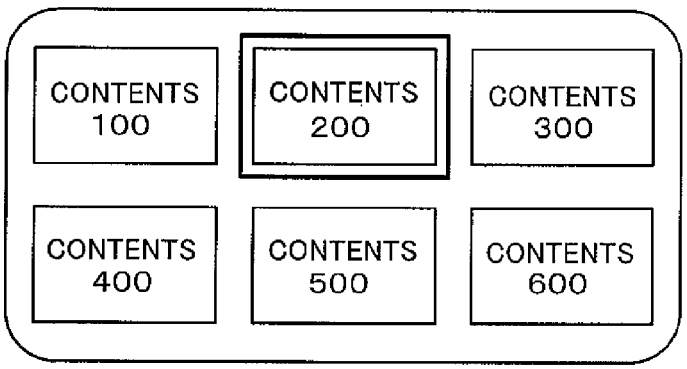
Figure 5C:
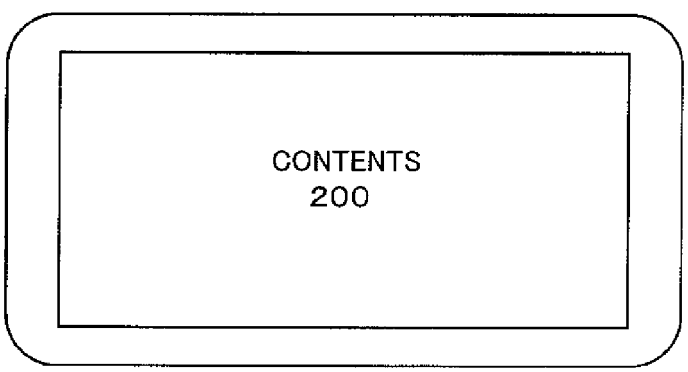

FIGS. 5A and 5B are examples of the screens the table display of reduced screens. Screens for the reduced display, each being obtained through receiving and decoding with using the communicating device and the decoding device, which are lower in the processing capacity thereof (contents 100 to contents 600), are displayed on a table, while being unified or integrated on one (1) screen. The user selects the contents, on which she/he wishes to make a full-screen display, while seeing the reduced screens thereof, and thereby designating. A cursor is shown by a thick frame surrounding one (1) reduced screen, being thick a little bit, and can be moved by means of an up/down or left/right key or the like of the remote controller, for example.

FIG. 5A is an example of screen of the table of reduced screens, and it shows the condition of selecting the contents 100, as a candidate of contents to be displayed with full-screen (not yet determined). FIG. 5B is an example of screen after pushing down the "right" key of the remote controller, by one (1) time, under the condition of FIG. 5A, and it shows the condition of selecting the contents 200, as a candidate of contents to be displayed with full-screen (not yet determined). FIG. 5C is an example of screen after pushing down a "select/determine" key of the remote controller, by one (1) time, under the condition of FIG. 5B, and it shows the condition where the designated contents for full-screen display of the contents 200, being received and decoded, is displayed with full-screen, by using the communicating device and the decoding device, which are higher in the processing capacity thereof.

Embodiment 1

Hereinafter, explanation will be made on a first embodiment for implementing the present invention. In the present embodiment, the explanation will be made on the case where the communicating device and the decoding device of the TV1 are higher in the performances thereof than those of the communicating device and the decoding device of the HDR2, as an example.

First of all, explanation will be made on the outlook structures of a system, according to the present embodiment, by referring to FIG. 6.

As is shown in FIG. 6, the system according to the present embodiment is made up with the TV1, the HDR2 and the distribution server 3, and each of them is connected with each other through a network. The distribution server 3 records low-definition contents for use of reduced display, high-definition contents for use of full-screen display, and contents for test use, therein.

The low-performance communicating device and the decoding device of the HDR2 receive the encoded low-definition contents for use of reduced display from the server 3, and decode it. And, the high-performance communicating device and the decoding device of the TV1 receive the encoded high-definition contents for use of full-screen from the server 3, and decode it. The display device of the TV1 outputs the data for use of reduced display, which is decoded by the low-performance decoding device of the HDR2, or the data for use of full-screen display, which is decoded by the high-performance decoding device of the TV1.

Although illustration is omitted in the figure, but for the purpose of measuring the processing capacity, the TV1 and HDR2 receive the encoded contents for test use from the server 3, and decode it. Also, the HDR2 transmits the decoded contents for test use to the TV1.

Next, explanation will be made on the operations of the TV1 ad the HDR2, within the present embodiment, by referring to FIG. 7.

First of all, for the purpose of checking the processing capacity of the communicating device 23 and the decoding device 25 of the HDR2, the TV1 transmits a receiving/decoding test command or request to the HDR2 (step 1001).

Next, the HDR2 decodes the encoded contents for use of test use, with using the communicating device 23 and the decoding device 25 of the HDR2, and transmits a staring time of receipt of the encoded contents for test use and the data for use of display, which was already decoded, as data for use of measurement, to the TV1 (step 1002).

Next, the TV1 measures the processing time, from the starting time of receipt of the encoded contents for test use up to the time when the data for use of measurement can be displayed on the display device 17 after being received (step 1003).

Herein, since it has the communicating device 13 and the decoding device 15 by itself, the TV1 receives and decodes the encoded contents for test use, with using the communicating device 13 and the decoding device 15, in the similar manner, and measures the processing time, from the starting time of receipt of the encoded contents for test use up to the time when the data for use of display, which was already decoded, can be displayed on the display device 17 (step 1003).

However, in the step 1003, if it is possible to know the time when the data can be displayed on the display device 17, there is no necessity to display it, actually, on the display device 17.

Next, the TV1 builds up the processing capacity database 126 by unifying the processing times of the communicating devices and the decoding devices on the system, for each of combination thereof, and it determines a set, having higher processing capacity (in the present embodiment, a set of the communicating device 13 and the decoding device 15 of the TV1), as that for use of full-screen display (step 1004).

Next, the TV1 transmits a request of data for use of reduced display, i.e., requiring to transmit the data for use of reduced display while receiving the encoded contents for use of the table display of reduced screens and decoding it, to the HDR2 (step 1005). For example, in case of the display screen of TV1 shown in FIGS. 5A to 5C, request is made on the data for use of reduced screens of the contents 100, 200, 300, 400, 500 and 600.

Next, the HDR2 received the encoded contents for use of the table display of reduced screens, which are designated, and produces the data for use of reduced display with decoding it (step 1006). Next, the HDR2 transmits the produced data for reduced display to the TV1 (step 1007).

Next, the TV1 unifies the received data for use of reduced display, and produces a picture of a table of the reduces screens, thereby to output it (step 1008).

Next, when the user selects the contents to be displayed with full-screen, to the TV1 (step 1009), the TV1 recognizes substance and a degree of definition of the contents, which it can receive from the distribution server 3 (step 1010). Herein, it is assumed that selection of the contents indicates the condition, which the user designates temporally, and that the contents are not yet determined at that time.

In case when there are the contents for use of full-screen display of the contents, which are under the selection, i.e., when the TV1 recognizes that the contents same to the contents under the selection, or other contents including those therein, are in the receivable condition, and also that it recognizes that the other contents is high in the degree of definition than the contents under the selection ("Yes" in step 1010), the TV1 receives the encoded contents for use of full-screen display, of the contents under the selection, and starts production of data for the full-screen display with decoding it (step 1011). If there is no contents for use of full-screen display, for the contents under the selection, i.e., if the TV1 recognizes that the contents same to the contents under the selection, or other contents including those therein, are not in the receivable condition, or that the other contents is lower in the degree of definition than the contents under the selection although it is under the receivable condition ("No" in step 1010), the TV1 starts production of the data for use of full-screen display by enlarging the contents for use of reduced display (step 1012).

Though illustration thereof is omitted in the figure, but until when the user determines the contents to be displayed with full screen, to the TV1 (step 1013), the processes from the step 1009 to the step 1012 are repeated, every time when changing the section.

Next, when the user determines the contents to be displayed with full screen, to the TV1 (step 1013), the TV1 outputs the data for full-screen display, production of which was already started in the step 1011 or the step 1012 (step 1014).

Heretofore, the explanation as made on the first embodiment for implementing or for reducing the present invention, into the practice thereof.

Embodiment 2

Hereinafter, explanation will be made on a second embodiment for implementing the present invention. In the present embodiment, the explanation will be made on the case where the communicating device and the decoding device of the TV1 are low in the performances thereof than those of the communicating device and the decoding device of the HDR2, for an example. Hereinafter, explanation will be omitted about the contents duplicating with those, which are described in other embodiment(s).

First of all, explanation will be made on the outlook structures of a system, according to the present embodiment, by referring to FIG. 8.

Figure 8:
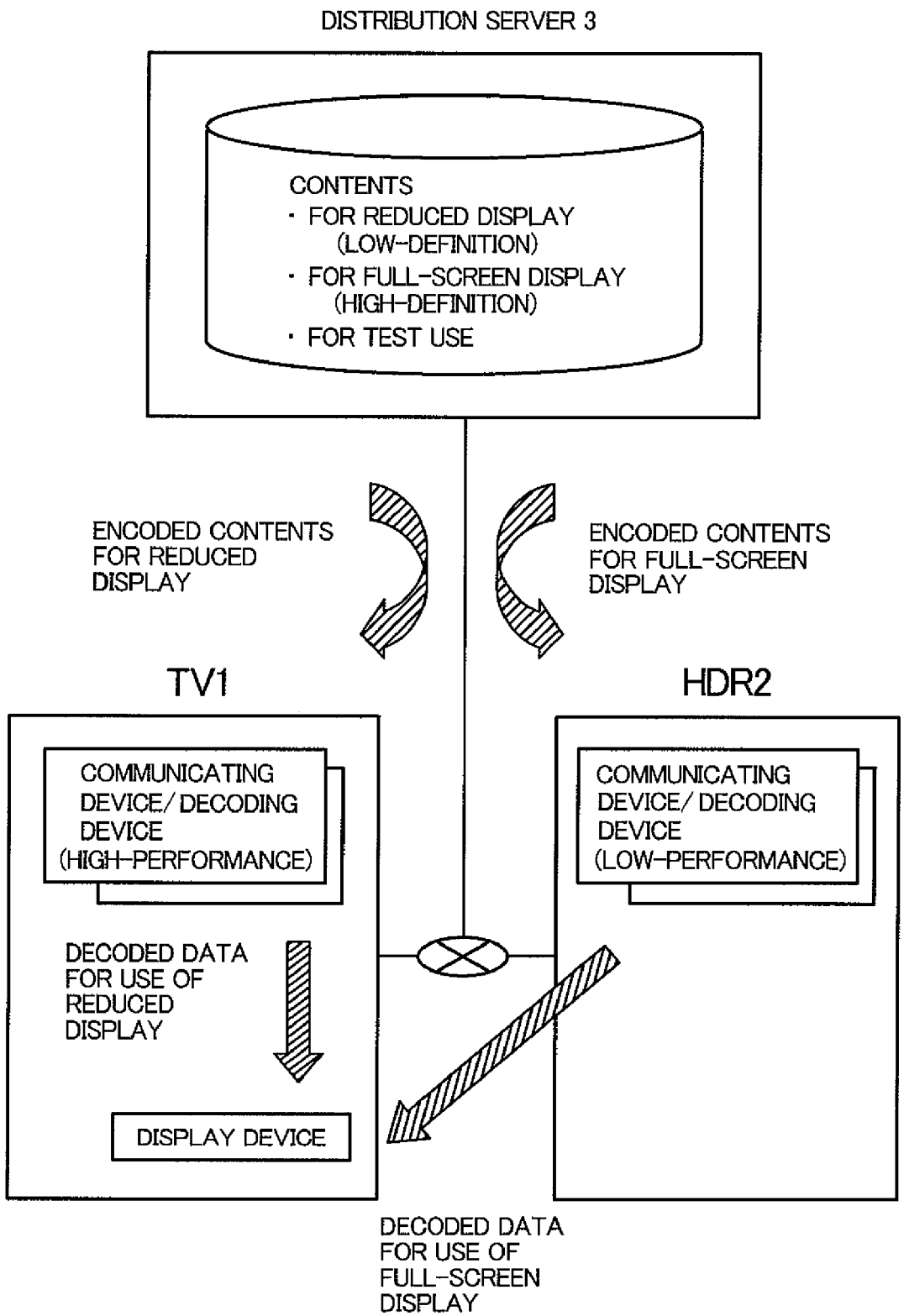
FIG. 8 is a view for showing an outlook structure of a system, according to an embodiment 2 of the present invention.

As is shown in FIG. 8, the system according to the present embodiment is made up with the TV1, the HDR2, the distribution server 3, and they are connected with each other through the network. The distribution server 3 records therein low-definition contents for use of reduced display, high-definition for use of full-screen display, and contents for test use. The low-performance communicating device and decoding device of the TV1 receive the encoded low-definition contents for use of reduced display, from the server 3, and decode it. Also, the high-performance communicating device and decoding device of the HDR2 receive the encoded high-definition contents, from the server 3, and decode it. The display device of the TV1 outputs the data for reduced display, which is decoded by the low-performance recoding device of the TV1, or the data for full-screen display, which is decoded by the high-performance decoding device of the HDR2.

Though illustration thereof is omitted in the figure, for the purpose of measuring the processing capacity, the TV1 and the HDR2 receive the encoded contents for test use from the server 3, and decode it. Also, the HDR2 transmits the contents for test use to the TV1.

Next, explanation will be made about the operations of the TV1 and the HDR2, in the present embodiment, by referring to FIG. 9.

Since the processes from a step 2001 to a step 2003 are same to those from the step 1001 to the step 1003, therefore the explanation thereof will be omitted.

Next, the processing capacity database 126 is built up by unifying the processing times of the communicating device and the decoding device on the system, for each of the combinations thereof, and it determines a set being higher in the processing capacity (in the present embodiment, the communicating device 23 and the decoding device 24 of the HDR2), as that for use of the full-screen display (step 2004).

Next, the TV1 receives the encoded contents for use of table-display of reduced screens, and produces the data for use of reduced display by decoding it (step 2005). For example, in case of the display screen of the TV1 shown in FIGS. 5A to 5C are produced the data for reduced display of the contents 100, 200, 300, 400, 500 and 600, for example.

Next, the TV1 unifies the produced data for reduced display, thereby producing the screen of the table of reduced screens, and outputs it (step 2006).

Next, when the user selects the contents to be displayed with the full-screen, to the TV1 (step 2007), the TV1 recognizes the substance and the degree of definition of the contents, which it can receive from the distribution server 3 (step 2008). Herein, it is assumed that selection of the contents indicates the condition, which the user designates temporally, and that the contents are not yet determined at that time.

In case when there are the contents for use of full-screen display of the contents, which are under the selection, i.e., when the TV1 recognizes that the contents same to the contents under the selection, or other contents including those therein, are in the receivable condition, and also that it recognizes that the other contents is high in the degree of definition than the contents under the selection ("Yes" in step 2008), the TV1 receives the encoded contents for use of full-screen display, and it transmits a request of the data for full-screen display, i.e., requiring to transmit the data for full-screen display while receiving the encoded contents for use of the table display of reduced screens and decoding it, to the HDR2 (step 2009).

Next, the HDR2 receives the encoded contents for full-screen display designated, and starts production of the data for use of full-screen display by decoding it (step 2010). Thus, it starts transmission of the reproduced data for use of full-screen display to the TV1 (step 2011).

If there is no contents for use of full-screen display, for the contents under the selection, i.e., if the TV1 recognizes that the contents same to the contents under the selection, or other contents including those therein, are not in the receivable condition, or that the other contents is lower in the degree of definition than the contents under the selection although it is under the receivable condition ("No" in step 2008), the TV1 starts production of the data for use of full-screen display by enlarging the contents for use of reduced display (step 2012).

Though illustration thereof is omitted in the figure, but until when the user determines the contents to be displayed with full screen, to the TV1 (step 2013), the processes from the step 2007 to the step 2012 are repeated, every time when changing the section.

Next, when the user determines the contents to be displayed with full screen, to the TV1 (step 2013), the TV1 outputs the data for full-screen display, production of which was already started in the step 2011 or the step 1012 (step 2014).

Heretofore, the explanation as made on the second embodiment for implementing or for reducing the present invention, into the practice thereof.

However, in the embodiments of the present invention, although the explanation was made with using the case where the HDR2 transmits the decoded video data to the communicating device 13 of the TV1 through the communicating device 23, but the video data may be transmitted from the outputting device 23 of the HDR2 with using a cable for use of video/audio, etc., to the display device 17, directly, but not passing through the communicating device 23 of the HDR2 and the communicating device 13 of the TV1.

Also, in the embodiments of the present invention, the explanation was made with using the case where the HDR2 transmits the decoded data to the TV1, without encoding it, but it may be transmitted after being encoded. In this case, the processing capacity is determined, by also taking the processing times for encoding and decoding, necessary for transmitting the data from the HDR2 to the TV1 into the consideration, in addition thereto.

Also, in the embodiment of the present invention, the explanation was made with using the case where the TV1 has the communication device and the decoding device, by one (1) unit for each, and also the HDR2 has the communication device and the decoding device, by one (1) unit for each, but the TV1 may have the communicating devices and the decoding devices, in a plural number thereof, for each. Or, in the TV1 or the HDR2, or in total of both of them, there may be a plural number of the communicating devices and one (1) unit of the decoding device, or one (1) unit of the communicating devices and a plural number of decoding devices. In those cases, the communicating device and the decoding device to be used are determined, upon basis of the processing time necessary, depending upon each of the combinations between the communicating device(s) and the decoding device(s).

Also, in the embodiments of the present invention, the explanation was made with using the case where the processing capacity is obtained for the communicating device and the decoding device, by measuring the processing time upon the contents for test use while receiving and decoding it for use of measuring the processing time, however the processing time may be measured with using the contents, being designated by the user to be reproduced, but not the contents for test use.

Also, not measuring it after receiving and decoding the contents, for test use, but the processing capacity may be obtained with using a measuring result, while measuring the processing time at time when the contents is designated by the user to be reproduced. Also, the processing capacity may be obtained by measuring the processing amount or volume of the receiving process and the decoding process, which can be processed during a unit of time, but not the processing time necessary for receiving and decoding the encoded contents for a unit of time. Also, the processing capacity may be obtained with using an index, which was already investigated, but not measuring it actually.

Also, with the embodiments of the present invention, the explanation was given with using the case where all of the data for use of reduced display are requested at once, for the contents desired, as the request of data for use of reduced display, to one (1) set of the communication device and the decoding device, however this request may be made one by one, sequentially. Or, the request may be shared with a set(s) other than that of the maximum performance, if there is/are the set(s) of the communicating device and the decoding device, otherwise, but not requesting all of it to the one (1) set of the communicating device and the decoding device.

Also, with the embodiments of the present invention, the explanation was given with using the case of the low-definition contents for use of reduced display, as the contents, the processing capacity required upon thereupon being relatively low, and the high-definition contents for use of full-screen display, as the contents, the processing capacity required thereupon being relatively high, as an example, but an index requesting the processing capacity may be another index, such as, an information volume of audio is large or small, but not high/low of the definition of the screen, etc., for example. Also, the way of use of the screen may be not for use of the reduced screen, or not for the full-screen display, and it may be a screen for other way of use thereof.

Further, each of the elements in the embodiments of the present invention may be combined with.

Heretofore, the explanation was given about the embodiments of the present invention.

With the embodiments of the present invention, the encoded contents are received and decoded with using a communicating means and a decoding means, which are higher in the processing capacity thereof. For this reason, it is possible to reproduce the contents, with stability much more, which is high in the processing capacity required thereupon. For example, it is possible to reproduce the contents being higher in the degree of definition, under the condition of less of noises.

Also, with the embodiments of the present invention, the encoded contents requesting low processing capacity for reproducing are reproduced with using a communicating means and a decoding means, which are lower in the processing capacity thereof. In parallel therewith, with using the communicating means and the decoding means, which are high in the processing capacity, reproduction is made on the contents requesting high processing capacity for reproduction thereof. For this reason, it is possible to change from a process requesting relatively low processing capacity to a process requesting relatively high processing capacity, with high-speed.

For example, after conducting the table display of reduced screens with receiving and decoding the encoded contents of the low-definition, the full-screen display is conducted by receiving and decoding the encoded contents of the high-definition. For this reason, it is possible to receive and decode the high-definition contents being same to the contents under selected at the present, under the background, when the user is selecting the contents to be reproduced on the table display of reduced screens, and thereby enable to start the reproduction of the high-definition contents for use of full-screen, quickly, when a viewer or audience determines the contents selection.

Also, with the embodiments of the present invention, measurement is made on the processing time, necessary for receiving and decoding the encoded contents for a unit of time, or the processing volume of the receiving process and the decoding process of the encoded contents, which can be processed during the unit of time, and it is managed as the processing capacity. For this reason, it is possible to select the communicating means and the decoding means, being more preferable comparing to the conventional art, by obtaining dynamic value measured actually while operating the equipments under the actual operating circumstances.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A contents reproducing apparatus, comprising:
   a communicating unit, which is configured to conduct a communicating process through network connection and a receiving process of encoded contents information, as encoded contents information;
   a decoding unit, which is configured to conduct a decoding process of said encoded contents information received;
   a processing capacity managing unit, which is configured to memorize or manage information relating to processing capacity of at least said receiving unit and said decoding unit;
   an input unit, which is configured to process an input of an operation of a user;
   a display unit, which is configured to display output information from said decoding unit;
   a controller unit, which is configured to control at least said communicating unit, said decoding unit, said processing capacity managing unit, said input unit and said display unit, further comprising
   a selection unit, which is configured to select said communicating unit and said decoding unit, so as to conduct processes therein, after referring to the information relating to the processing capacities of a plural number of said communicating units and a plural number of said decoding units, which are memorized in said processing capacity managing unit;
   wherein:
   said processing capacity managing unit memorizes or manages the information relating to the processing capacities of the communicating unit and the decoding unit included within other contents reproducing apparatus(es), which is/are connected therewith through the network; and
   said selection unit selects a set of the communicating unit and the decoding unit, which has the information relating to higher processing capacity, after referring to the information relating to the processing capacities of the plural number of said communicating units and a plural number of said decoding units, which are memorized in said processing capacity managing unit; and
   said contents reproducing apparatus further comprising a contents identifying unit, which is configured to identify whether to be the same contents information, which is selected by said input unit, or not to be the other information including contents, which is selected, wherein:

said contents identifying unit identifies said other contents information to be receivable or nor, and also identifies the information relating to the processing capacity, which is required for a reproducing process of said other contents information, and also, output information of said contents identifying unit inputted into said selection unit, when said contents identifying unit identifies that the information relating to the processing capacity, which is required for the reproducing process of said other contents information is higher than the information relating to the capacity, which is required for the reproducing process of said information selected, and said selection unit events said communicating unit and said decoding unit, which are higher in the information relating to said processing capacity, from conducting the receiving process and the decoding process of the contents information selected.

2. The contents reproducing apparatus, as described in the claim 1, wherein the information relating to said processing capacity is information corresponding to processing times necessary for processes within said communicating unit and said decoding unit, for the encoded contents information of a predetermined volume;

a processing time detecting unit is provided for detecting information corresponding to said processing time;

the information corresponding to the processing time detected by said processing time detecting unit is memorized in said processing capacity managing unit; and said processing capacity managing unit manages one being shorter in the processing time, as the information corresponding to said processing time, to be that being higher in said processing capacity.

3. The contents reproducing apparatus, as described in the claim 1, wherein the information relating to said processing capacity is information corresponding to a processing volume of the encoded contents information, which said communicating unit can receive during a predetermined unit of time, and a processing volume of the encoded contents information, which said decoding unit can decode during a predetermined time unit;

a processing time detecting unit is provided for detecting information corresponding to said processing volumes;

information corresponding to the processing volumes detected by said processing time detecting unit is memorized in said processing capacity managing unit; and said processing capacity managing unit manages one being larger in the processing volume, as the information corresponding to said processing volume, to be that being higher in said processing capacity.

4. The contents reproducing apparatus, as described in the claim 1, wherein when said contents identifying unit identifies that the information relating to the processing capacity, which is required for the reproducing process of the other contents is higher than the information relating to the processing capacity, which is required for the reproducing process of the contents, which is under selection thereof, said selection unit allows said communicating unit and said decoding unit, which are lower in the information relating to said processing capacity, to conduct the receiving process and the decoding process of the contents information, which is selected, said selection unit allows said communicating unit and said decoding unit, which are higher in the information relating to said processing capacity, to conduct the receiving process and the decoding process of said other contents information, said display unit displays said selected contents information, which is decoded by said decoding unit, lower in the information relating to said processing capacity, and when said contents identifying unit identifies that the selection of contents information is changed from said selected contents information to said other contents information, said display unit displays said other contents information, which is decoded by said decoding unit, being higher in the information relating to said processing capacity.

5. A contents reproducing method, comprising the following steps of:

a communicating step for conducting a communicating process through a network connection and a receiving process of encoded contents information, which is contents information encoded;

a decoding step for conducting a decoding process of said encoded contents information received;

a processing capacity managing step for memorizing or managing information relating to processing capacities of said receiving process and said decoding process, at least;

an input processing step for processing an input of operation by a user; and a displaying step for displaying output information form said decoding step, further providing a selecting step for selecting said communicating step and said decoding step, after referring to the information relating to the processing capacities of a plural number of communicating steps and a plural number of decoding steps, which are memorized in said processing capacity managing step, thereby conducting the processes; and wherein:

an executing means is selected which is higher in the information relating to said processing capacity, in said selection step;

a contents identifying step is provided for identifying whether to be same to the contents information which is selected in said input processing step, or other contents information, which includes said contents information selected, said contents identifying step identifies whether said other contents information is receivable or not, and also identifies the information relating to the processing capacity which is required for a reproducing process of said other contents information, when identifying that the information relating to the processing capacity, which is required for the reproducing process of said other contents, is higher than the information relating to the processing capacity, which is required for the reproducing process of said contents information selected, in said contents identifying step, and the receiving process and the decoding process of said contents information selected are prevented from being conducted by an executing means being higher in the information relating to said processing capacity, in said selectins step, wherein at least one of the communication step, the decoding step, the processing capacity managing step, the input processing step, the displaying step and the selecting step, is effected, at least in part, by a processor.

6. The contents reproducing method, as described in the claim 5, wherein the information relating to said processing capacity is information corresponding to processing times necessary for processes within said communicating step and said decoding step, for the encoded contents information of a predetermined volume;

a processing time detecting step is provided for detecting information corresponding to said processing time;

the information corresponding to the processing time, which is detected in said processing time detecting step, is memorized in said processing capacity managing step; and one being shorter in the processing time is managed as the information corresponding to said processing time, to be one being higher in said processing capacity, in said processing capacity managing step.

7. The contents reproducing method, as described in the claim 5, wherein the information relating to said processing capacity is information corresponding to a processing volume of the encoded contents information, which said communicating unit can receive during a predetermined unit of time, and a processing volume of the encoded contents information, which said decoding unit can decode during a predetermined time unit;

a processing time detecting step is provided for detecting information corresponding to said processing volumes; and one being larger in the processing volume is managed as the information corresponding to said processing volume, to be one being higher in said processing capacity, in said processing capacity managing step.

8. The contents reproducing method, as described in the claim 5, wherein information relating to the processing capacities of the communicating step and the decoding step, which are included in other contents reproducing apparatus(es) connected through the network is memorized or managed in said processing capacity managing step.

9. The contents reproducing method, as described in the claim 5, wherein when identifying that the information relating to the processing capacity, which is required for the reproducing process of said other contents information is higher than the information relating to the processing capacity, which is required for the reproducing process of said contents information selected, in said contents identifying step, said receiving process and said decoding process of said contents under selection are conducted by the executing means, which are lower in said processing capacity, in said selecting step, said receiving process and said decoding process of said other contents information are conducted by the executing means, which are higher in said processing capacity, said selected contents information decoded by said executing means, which is lower in the information relating to said processing capacity, is displayed, in said displaying step, and when selection of the contents information is changed from said selected contents information to said other contents, in said contents identifying step, said contents information is displayed, which is decoded by said executing means, being higher in the information relating to said processing capacity, in said displaying step.

* * * * *